(12) United States Patent
Ucar et al.

(10) Patent No.: US 12,077,174 B2
(45) Date of Patent: Sep. 3, 2024

(54) COMPENSATING MISMATCH IN ABNORMAL DRIVING BEHAVIOR DETECTION

(71) Applicant: Toyota Motor Engineering & Manufacturing North America, Inc., Plano, TX (US)

(72) Inventors: Seyhan Ucar, Mountain View, CA (US); Emrah Akin Sisbot, Menlo Park, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 92 days.

(21) Appl. No.: 17/894,320

(22) Filed: Aug. 24, 2022

(65) Prior Publication Data

US 2024/0067200 A1 Feb. 29, 2024

(51) Int. Cl.
*B60W 50/14* (2020.01)
*B60K 35/00* (2006.01)
(Continued)

(52) U.S. Cl.
CPC ............. *B60W 50/14* (2013.01); *B60K 35/00* (2013.01); *B60W 40/02* (2013.01); *B60W 40/08* (2013.01);
(Continued)

(58) Field of Classification Search
CPC ...... B60W 50/14; B60W 40/02; B60W 40/08; B60W 2555/20; B60W 2554/4046;
(Continued)

(56) References Cited

U.S. PATENT DOCUMENTS 8,350,696 B2   1/2013  McClellan et al.
8,885,929 B2  11/2014  Ni et al.
(Continued)

FOREIGN PATENT DOCUMENTS

CN    109325755 A    2/2019
EP       1695310 B1   9/2008
WO    2018115963 A2   6/2018

OTHER PUBLICATIONS

Zohrevand, "Should I Raise the Red Flag? A comprehensive survey of anomaly scoring methods toward mitigating false alarms," Aug. 30, 2020 (11 pages).
(Continued)

*Primary Examiner* — Zhen Y Wu
(74) *Attorney, Agent, or Firm* — Christopher G. Darrow; Darrow Mustafa PC (57) ABSTRACT

Compensation can be made for mismatch in abnormal driving behavior detection between an ego vehicle and its human driver. Sensor data of a surrounding driving environment can be acquired. The acquired sensor data can be analyzed to detect abnormal driving behavior by a vehicle in the surrounding driving environment. Responsive to detecting abnormal driving behavior by the vehicle in the surrounding driving environment, the abnormal driving behavior can be classified as to whether it is severe. If the abnormal driving behavior is classified as not being severe, an amplified version of the abnormal driving behavior can be caused to be presented to the human driver of the ego vehicle.

22 Claims, 7 Drawing Sheets

(51) Int. Cl.
*B60W 40/02* (2006.01)
*B60W 40/08* (2012.01)
*B60K 35/28* (2024.01)
*B60K 35/29* (2024.01)

(52) U.S. Cl.
CPC .............. *B60K 35/28* (2024.01); *B60K 35/29* (2024.01); *B60K 2360/178* (2024.01); *B60K 2360/1868* (2024.01); *B60W 2050/143* (2013.01); *B60W 2050/146* (2013.01); *B60W 2554/4046* (2020.02); *B60W 2555/20* (2020.02)

(58) Field of Classification Search
CPC ...... B60W 2050/143; B60W 2050/146; B60K 35/00; B60K 2360/178; B60K 35/28; B60K 2360/1868; B60K 35/29
USPC .......................................................... 340/435
See application file for complete search history.

(56) References Cited

U.S. PATENT DOCUMENTS

| | | | |
|---|---|---|---|
| 9,714,037 B2 | 7/2017 | DeRuyck et al. | |
| 10,359,782 B1 | 7/2019 | Hayward | |
| 10,513,274 B1* | 12/2019 | Sung ................... | G05D 1/0088 |
| 10,713,948 B1 | 7/2020 | Kim et al. | |
| 10,950,065 B1 | 3/2021 | Fields et al. | |
| 11,256,937 B2* | 2/2022 | Ucar .................... | G06F 18/214 |
| 2017/0057410 A1* | 3/2017 | Oh ........................ | B60W 30/00 |
| 2017/0075701 A1 | 3/2017 | Ricci et al. | |
| 2017/0186320 A1* | 6/2017 | Lai ......................... | H04L 67/12 |
| 2017/0287186 A1* | 10/2017 | Saito ...................... | G06T 11/60 |
| 2017/0309248 A1* | 10/2017 | Mori .................. | B62D 15/0295 |
| 2018/0150701 A1* | 5/2018 | Kang ................. | G06F 18/2413 |
| 2018/0165963 A1* | 6/2018 | Lai .................... | G08G 1/096775 |
| 2018/0257647 A1* | 9/2018 | Jurca ..................... | G01S 13/931 |
| 2018/0284759 A1 | 10/2018 | Michalakis et al. | |
| 2020/0043254 A1* | 2/2020 | Hase .................... | G08G 1/0133 |
| 2020/0074208 A1* | 3/2020 | Choi ..................... | G06F 16/587 |
| 2020/0139990 A1* | 5/2020 | Hiruma ............. | B60W 50/0205 |
| 2020/0219386 A1 | 7/2020 | El Assaad | |
| 2020/0231178 A1* | 7/2020 | Murayama ........ | B60W 60/0016 |
| 2020/0250982 A1 | 8/2020 | Kim et al. | |
| 2020/0391730 A1* | 12/2020 | Kim ...................... | B60W 30/09 |
| 2021/0004612 A1* | 1/2021 | Misawa ................ | G06T 7/0002 |
| 2021/0287532 A1 | 9/2021 | Lee et al. | |
| 2021/0370980 A1 | 12/2021 | Ramamoorthy et al. | |
| 2022/0080827 A1* | 3/2022 | Sung ................... | B60W 30/095 |
| 2022/0212690 A1* | 7/2022 | Zheng ................... | B60W 50/14 |
| 2022/0340158 A1* | 10/2022 | Chambers ............. | B60W 50/14 |
| 2023/0186396 A1* | 6/2023 | Kuroda .................. | G07C 5/085 705/4 |
| 2023/0192084 A1* | 6/2023 | Choi ..................... | B60W 30/16 |
| 2024/0001951 A1* | 1/2024 | Gray ....................... | H04W 4/44 |

OTHER PUBLICATIONS

Hundman, et al., "Detecting Spacecraft Anomalies Using LSTMs and Nonparametric Dynamic Thresholding," Association for Computing Machinery, <https://doi.org/10.1145/3219819.3219845>, Jun. 6, 2018 (9 pages).

Xu et al., "Transitioning to human interaction with AI systems: New challenges and opportunities for HCI professionals to enable human-centered AI," Jan. 7, 2022 (69 pages).

Al-Naji et al., "An efficient motion magnification system for real-time applications," Machine Vision and Applications, 2018, pp. 585-600 (16 pages).

Mihelj et al., "Crowdsourced Traffic Event Detection and Source Reputation Assessment Using Smart Contracts", MDPI, Published Jul. 25, 2019 (17 pages).

Lappi, "Eye movements in the wild: oculomotor events, gaze behavior and frames of reference", Neuroscience & Behavioral Reviews, 69, 49-68, Jun. 6, 2016 (41 pages).

Lappi et al., "Systematic Observation of an Expert Driver's Gaze Strategy—An On-Road Case Study", Frontiers, Apr. 27, 2017 (34 pages).

* cited by examiner

```
┌─────────────────────────────────────────────────────┐
│  Acquire sensor data of surrounding driving environment │
│                         210                         │
└─────────────────────────────────────────────────────┘
                          │
                          ▼
┌─────────────────────────────────────────────────────┐
│   Analyze acquired sensor data to detect abnormal driving │
│                      behavior                       │
│                         220                         │
└─────────────────────────────────────────────────────┘
                          │
                          ▼
┌─────────────────────────────────────────────────────┐
│  Responsive to detecting abnormal driving behavior, classify │
│     whether the abnormal driving behavior is severe │
│                         230                         │
└─────────────────────────────────────────────────────┘
                          │
                          ▼
┌─────────────────────────────────────────────────────┐
│  If abnormal behavior is classified as being not severe, cause │
│   an amplified version of the abnormal driving behavior to be │
│       presented to the human driver of the vehicle  │
│                         240                         │
└─────────────────────────────────────────────────────┘
```

COMPENSATING MISMATCH IN ABNORMAL DRIVING BEHAVIOR DETECTION

FIELD

The subject matter described herein relates in general to abnormal driving behavior and, more particularly, to differences in perception of abnormal driving behavior by human drivers and vehicle sensors.

BACKGROUND

Distracted driving is a major concern for the public, as it can abuse or jeopardize the safety of the driver, vehicle passengers, the occupants of other vehicle, and pedestrians. It can also lead to damage to objects in the environment. According to some statistics, a sizable percentage of all accidents include at least one aggressive driver. Further, a recent survey shows that 87% of United States drivers have engaged in distracted driving. Rear-end collision is the most frequent type of collision in United States; most of these collisions are due to distracted/reckless driving behavior.

SUMMARY

In one respect, the present disclosure is directed to a method of compensating for mismatch in abnormal driving behavior detection between a human driver and an ego vehicle. The method can include acquiring sensor data of a surrounding driving environment. The method can include analyzing the acquired sensor data to detect abnormal driving behavior by a vehicle in the surrounding driving environment. Responsive to detecting abnormal driving behavior by the vehicle in the surrounding driving environment, the method can include classifying whether the abnormal driving behavior is severe. If the abnormal driving behavior is classified as being not severe, the method can include causing an amplified version of the abnormal driving behavior to be presented to the human driver of the ego vehicle.

In another respect, the present disclosure is directed to a system for compensating for mismatch in abnormal driving behavior detection between a human driver and an ego vehicle. The system can include one or more processors. The one or more processors can be programmed to initiate executable operations. The executable operations can include acquiring sensor data of a surrounding driving environment. The executable operations can include analyzing the acquired sensor data to detect abnormal driving behavior by a vehicle in the surrounding driving environment. The executable operations can include, responsive to detecting abnormal driving behavior by the vehicle in the surrounding driving environment, classifying whether the abnormal driving behavior is severe. The executable operations can include, if the abnormal driving behavior is classified as being not severe, causing an amplified version of the abnormal driving behavior to be presented to the human driver of the ego vehicle.

DETAILED DESCRIPTION

Early detection of abnormal driving behavior is important. When abnormal driving is detected, a driver can take necessary actions (e.g., lane change, reroute, etc.) to mitigate the risk of collision. Vehicles are equipped with variety of sensors that may surpass human perception capabilities. The unequal perception of the driving environment by a human driver and the vehicle can cause a mismatch in the detection of abnormal driving behavior. For instance, a vehicle can detect very minor swerving driving behavior, which is an early indicator that the follower vehicle is a distracted driver. However, a human driver may miss such minor abnormal driving since it is hard to observe subtle anomalies (e.g., slightly swerving inside the lane) with the naked eye. As a result, the human driver may think that the vehicle is behaving normally and may ignore the early notifications of abnormal driving behavior provided the vehicle. However, the abnormal driving continues to jeopardize the safety of the vehicle. In addition to such misunderstanding, drivers may lose trust in the vehicle. For instance, a vehicle can notify a driver about a distracted driver, such as a distracted following vehicle, based on very minor swerving behavior. The driver may look into his or her rear-view mirror and interpret the situation as being normal. In such case, the driver may lose trust is the vehicle's ability to detect abnormal driving behavior.

Thus, arrangements described herein are directed to compensating for the mismatch in abnormal driving detection between an ego vehicle and its human driver. The term "ego vehicle" is used to indicate a vehicle that is the reference vehicle with respect to which the surrounding environment and/or other vehicles are perceived. The ego vehicle can acquire sensor data of the surrounding driving environment. The acquired sensor data can be analyzed to detect abnormal driving behavior by another vehicle in the surrounding driving environment. Responsive to detecting abnormal driving behavior by the vehicle in the surrounding driving environment, the abnormal driving behavior can be classified as being major or minor. If the abnormal driving behavior is classified as being minor, an amplified version of the abnormal driving behavior can be presented to the human driver of the ego vehicle. As a result, a human driver may be able to better understand the abnormal driving behavior detected by vehicle sensors.

As used herein, an "abnormal driving behavior" can be any unusual behaviors exhibited by the driver of a vehicle in the operation of the vehicle. Non-limiting examples of anomalous events can include aggressive driving (e.g., tailgating, cutting in a lane, etc.), distracted driving (e.g., swerving, delayed reaction, etc.), and reckless driving (e.g., green light running, lane change without signaling, etc.). While many of the examples described herein will be in connection with distracted driving, it will be understood that arrangements described herein are not limited to distracted driving.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
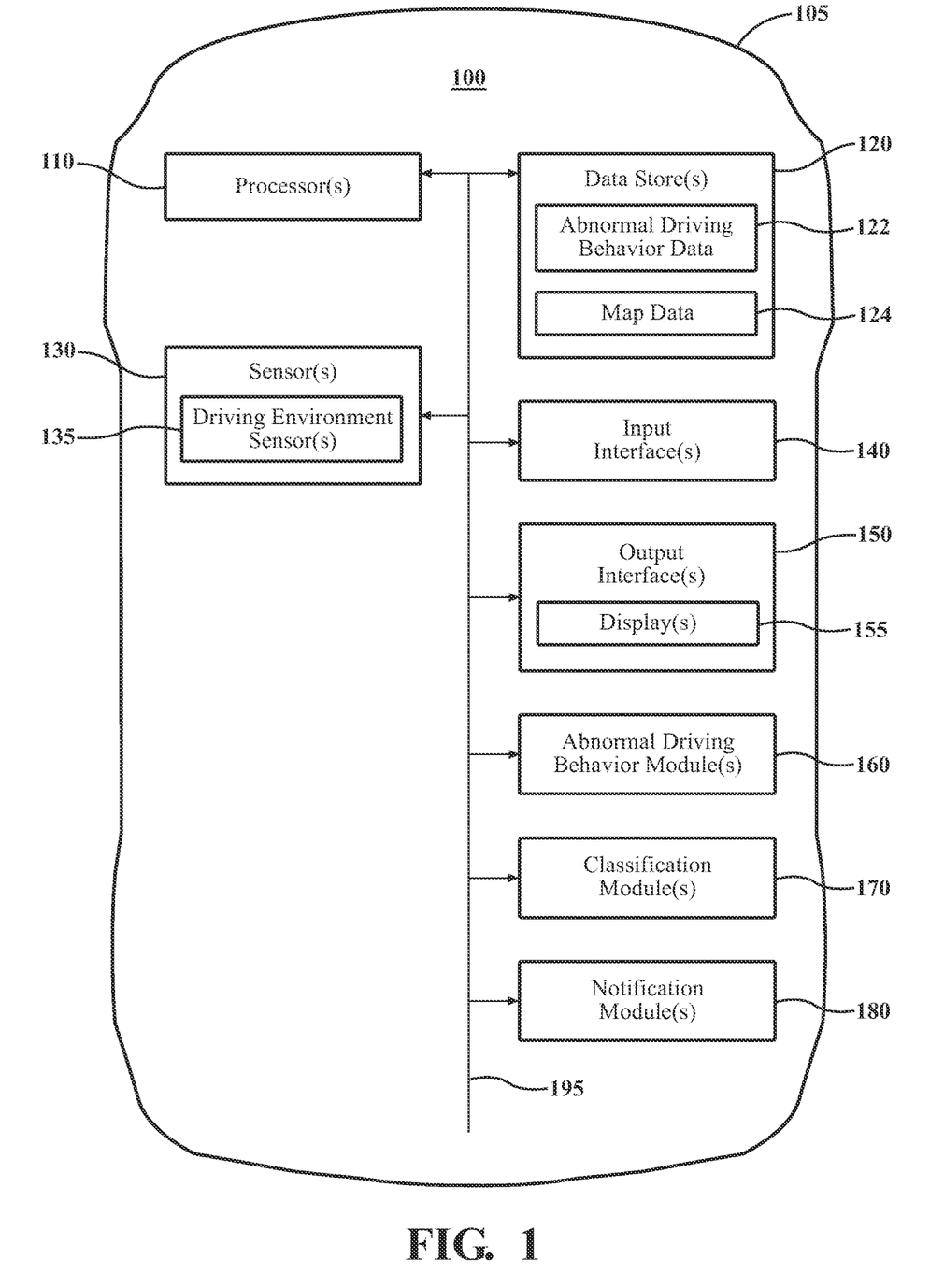
FIG. 1 is an example of a system for compensating for mismatch in abnormal driving behavior detection between a human driver and an ego vehicle.

FIG. 1 is an example of a system 100 for compensating for mismatch in abnormal driving detection between a human driver and an ego vehicle. Some of the possible elements of the system 100 are shown in FIG. 1 and will now be described. It will be understood that it is not necessary for the system 100 to have all of the elements shown in FIG. 1 or described herein. The system 100 can include one or more processors 110, one or more data stores 120, one or more sensors 130, one or more input interfaces 140, one or more output interfaces 150, one or more abnormal driving behavior modules 160, one or more classification modules 170, and/or one or more notification modules 180.

In one or more arrangements, at least some of these various elements of the system 100 can be located onboard a vehicle 105, which will also be referred to herein as the ego vehicle 105. In one or more arrangements, all of the various elements of the system 100 can be located onboard the vehicle 105. As used herein, "vehicle" means any form of motorized or powered transport, now known or later developed. Non-limiting examples of vehicles include automobiles, motorcycles, aerocars, or any other form of motorized transport. While arrangements herein will be described in connection with land-based vehicles, it will be appreciated that arrangements are not limited to land-based vehicles. Indeed, in some arrangements, the vehicle can be water-based or air-based vehicles. The vehicle 105 may be operated manually by a human driver, semi-autonomously by a mix of manual inputs from a human driver and autonomous inputs by one or more vehicle computers, fully autonomously by one or more vehicle computers, or any combination thereof. Of course, it will be appreciated that one or more elements of the system 100 can be located remote from the vehicle 105.

Each of the above noted elements of the system 100 will be described in turn below. The system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. In some arrangements, the data store(s) 120 can be located remote from the vehicle 105. The term "operatively connected," as used throughout this description, can include direct or indirect connections, including connections without direct physical contact.

The data store(s) 120 can include abnormal driving behavior data 122. The abnormal driving behavior data 122 can include any information that can used to assess whether certain sensor data would be indicative of an abnormal driving behavior. Examples of abnormal driving behavior can include aggressive driving (e.g., tailgating, cut-in lane, etc.), distracted driving (e.g., swerving, veering across lines, delayed reaction, etc.), and/or reckless driving (e.g., green light running, lane change without signaling, etc.). The abnormal driving behavior data 122 can including information about patterns or ranges of driving behavior considered to be unique to and/or otherwise indicative of abnormal driving. The abnormal driving behavior data 122 can include thresholds of behaviors or vehicle movements that would be indicative of abnormal driving behavior. The abnormal driving behavior data 122 can be based on driving behaviors from a general population of drivers or any suitable group of drivers.

The data store(s) 120 can include map data 124. The map data 124 can include maps of one or more geographic areas. In some instances, the map data 124 can include information or data on roads, traffic control devices, road markings, streetlights, structures, features, and/or landmarks in the one or more geographic areas. The map data 124 can include measurements, dimensions, distances, positions, coordinates, and/or information for one or more items included in the map data 124 and/or relative to other items included in the map data 124. For instance, the map data 124 can include the dimensions of individual travel lanes of a road. As an example, the map data can include the width of a travel lane and/or the centerline of the travel lane. The map data 124 can include a digital map with information about road geometry. In one or more arrangement, the map data 124 can include information about the ground, terrain, roads, surfaces, and/or other features of one or more geographic areas. The map data 124 can include elevation data in the one or more geographic areas. The map data 124 can define one or more ground surfaces, which can include paved roads, unpaved roads, land, and other things that define a ground surface. The map data 124 can include lane markings and associated dimensions. The map data 124 can be high quality and/or highly detailed.

The system 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 100 includes a plurality of sensors, the sensors can work independently from each other. Alternatively, two or more of the sensors can work in combination with each other. In such case, the two or more sensors can form a sensor network.

The sensor(s) 130 can include any suitable type of sensor. Various examples of different types of sensors will be described herein. However, it will be understood that the embodiments are not limited to the particular sensors described.

The sensor(s) 130 can include one or more driving environment sensors 135. Such sensors can be used to detect, determine, assess, monitor, measure, quantify, acquire, and/or sense, directly or indirectly, something about the external environment of the vehicle 105. For instance, the driving environment sensor(s) 135 can be used to detect, determine, assess, monitor, measure, quantify, acquire, and/or sense, directly or indirectly, the presence of one or more objects in the external environment of the vehicle 105, the position or location of each detected object relative to the vehicle 105, the distance between each detected object and the vehicle 105 in one or more directions (e.g. in a longitudinal direction, a lateral direction, and/or other direction(s)), the elevation of a detected object, the speed of a detected object, the acceleration of a detected object, the heading angle of a detected object, and/or the movement of each detected obstacle.

The driving environment sensor(s) 135 can be any suitable sensor, now known or later developed. In one or more arrangements, the driving environment sensor(s) 135 can include one or more radar sensors, one or more lidar sensors, one or more sonar sensors, and/or one or more cameras.

The system 100 can include one or more input interfaces 140. An "input interface" includes any device, component, system, element or arrangement or groups thereof that enable information/data to be entered into a machine. The input interface(s) 140 can receive an input from a vehicle occupant (e.g. a driver or a passenger). Any suitable input interface(s) 140 can be used, including, for example, a keypad, display, touch screen, multi-touch screen, button, joystick, mouse, trackball, microphone and/or combinations thereof.

The system 100 can include one or more output interfaces 150. An "output interface" includes any device, component, system, element or arrangement or groups thereof that enable information/data to be presented to a vehicle occupant (e.g. a driver, a passenger, etc.). The output interface(s) 150 can present information/data to the vehicle occupant.

The output interface(s) 150 can include a display. Alternatively or in addition, the output interface(s) 150 may include an earphone and/or speaker. Some components of the system 100 may serve as both a component of the input interface(s) 140 and a component of the output interface(s) 150.

Figure 4:
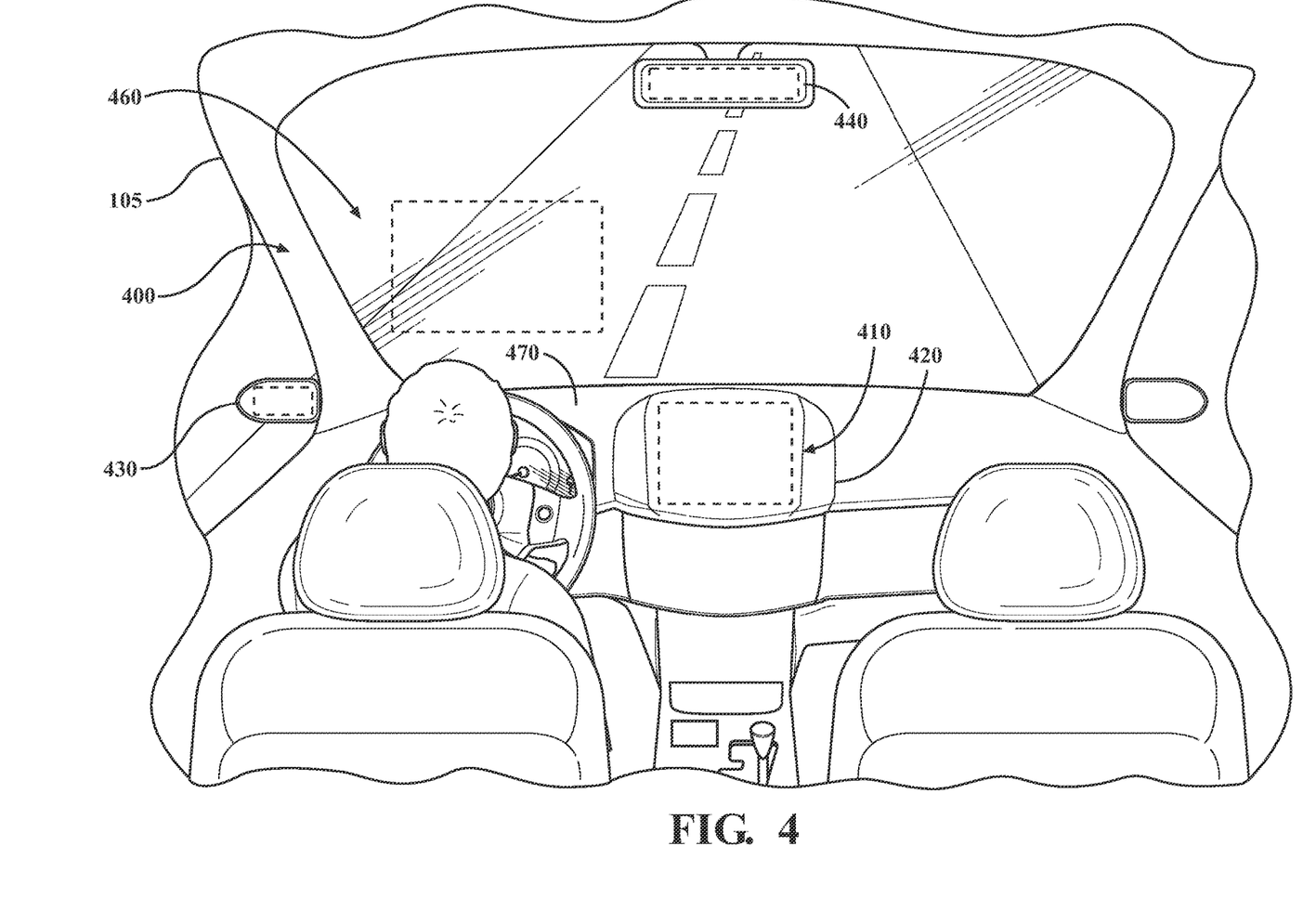
FIG. 4 is an example of a vehicle, showing different locations for displaying the amplified version of abnormal driving behavior.

The output interface(s) 150 can include one or more displays. FIG. 4 is an example of a cabin 400 of the ego vehicle 105, showing different locations for displaying an amplified version of abnormal driving behavior, as will be described herein. For instance, the amplified version of the abnormal driving behavior can be presented on a display 410 that is part of an infotainment system 420. As another example, amplified version of abnormal driving behavior can be presented on a display of a side view mirror 430 or a rear-view mirror 440 of the vehicle 105. As a further example, the amplified version of abnormal driving behavior can be presented on a surface of the windshield 460 or a surface of the dashboard 470 of the vehicle 105. In some arrangements, the amplified version of abnormal driving behavior can be presented on a display. In some arrangements, the amplified version of abnormal driving behavior can be presented as a projection, such as by one or more projectors located within the cabin 405. In some arrangements, the amplified version of abnormal driving behavior can be presented on a heads-up display. The amplified version of abnormal driving behavior can be presented on any other object within or surface of the vehicle. Of course, the amplified version of abnormal driving behavior can be presented on a plurality of surfaces or objects, including any combination of the objects/surfaces noted above. Thus, it will be appreciated that arrangements described herein are not limited to any particular user interface for presenting the amplified version of abnormal driving behavior.

The system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 120 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The system 100 can include one or more abnormal driving behavior modules 160. The abnormal driving behavior module(s) 160 can be configured to receive sensor data from the sensor(s) 130, such as driving environment data from the driving environment sensor(s) 135. The abnormal driving behavior module(s) 160 can be configured to analyze driving environment data to detect and/or identify any abnormal driving behavior(s) therein. In some instances, the abnormal driving behavior module(s) 160 can be configured to analyze the driving environment data using machine learning, machine vision, pattern recognition, or deep learning techniques to detect and/or identify an abnormal driving behavior(s) in the driving environment data. The abnormal driving behavior module(s) 160 can be configured to run abnormal driving detection algorithms.

In some instances, the abnormal driving behavior module(s) 160 can be configured to compare the data received from the sensor(s) 130 to the abnormal driving behavior data 122. The abnormal driving behavior module(s) 160 can be configured to determine a probability or confidence level that an abnormal driving behavior has occurred. In some instances, the abnormal driving behavior module(s) 160 can be configured to analyze a movement of another vehicle is the surrounding driving environment to determine whether an abnormal driving behavior (e.g., distracted driving, aggressive driving, reckless driving, etc.) has occurred. If an abnormal driving behavior is detected, the abnormal driving behavior module(s) 160 can be configured to send a notification to the classification module(s) 170. If no abnormal driving behavior is detected, the abnormal driving behavior module(s) 160 may not take any action.

The abnormal driving behavior can be detected in any suitable manner, now known or later developed. In one example, if vehicle behavior as defined by data acquired by the sensor(s) 130 is identical or matches within a predetermined probability (e.g., about 85% or greater, about 90% or greater, about 95% or greater, etc.) or confidence level, a profile in the abnormal driving behavior data 122, then the abnormal driving behavior module(s) 160 detects that there is abnormal driving behavior. However, if vehicle behavior as defined by data acquired by the sensor(s) 130 is not identical or does not match within a predetermined probability or confidence level, then the abnormal driving behavior module(s) 160 does not detect that there is abnormal driving behavior.

Figure 6:
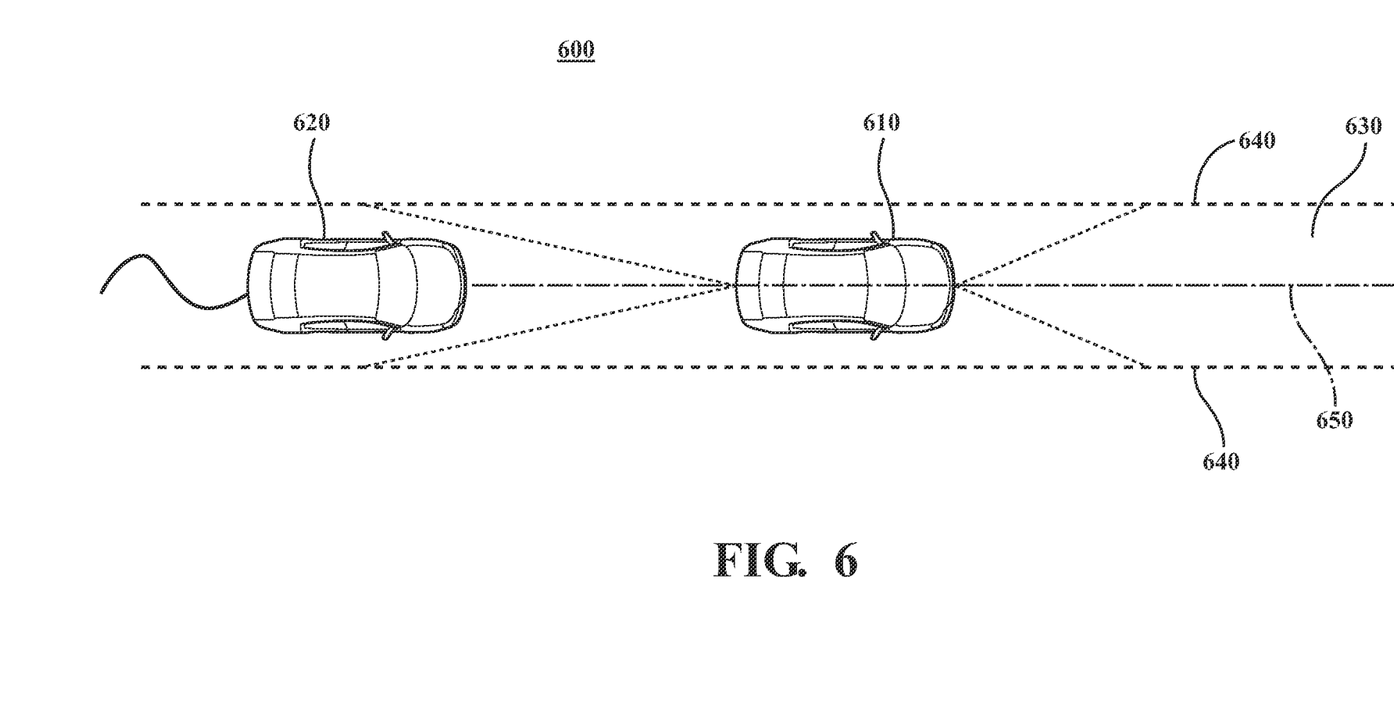
FIG. 6 is an example of the detection of abnormal driving behavior by an ego vehicle.

One example of the detection of abnormal driving behavior will now be explained in connection with FIG. 6. FIG. 6 shows a driving environment 600 with an ego vehicle 610 and a following vehicle 620. The ego vehicle 610 and the following vehicle 620 can be located in a travel lane 630. The travel lane 630 can be defined by lane markers 640. The travel lane 630 can have a lane center 650. In this example, the following vehicle 620 can be veering right and left inside the travel lane 630.

The ego vehicle 610 can be configured to detect the lane markers. Using the detected lane markers 640, the ego vehicle 610 can determine the lane center 650 of the travel lane 630. The ego vehicle 610 can track the lane centering behavior of the following vehicle 620. The ego vehicle 610 can measure the lane level driving behavior of the following vehicle 620. For instance, the ego vehicle 610 can measure the offset of the following vehicle 620 from the lane center 650. As an example, the ego vehicle 610 can do so by acquiring or calculating distance measurements of the following vehicle 620 to the lane markers 640. The ego vehicle 610 can analyze the offset from the lane center 650. The ego vehicle 610 can identify the distracted driving (e.g., veering right and left inside the lane) in any suitable manner. For instance, the ego vehicle 610 can detect distracted driving based on the distance of veering or the frequency of veering. Alternatively, the ego vehicle 610 can compared the movement pattern of the following vehicle 620 to the abnormal driving behavior data 122 to see whether it matches a profile therein.

When abnormal driving behavior is detected, the abnormal driving behavior module(s) 160 can be configured to save and/or update the record for each detection. These records can be stored in the data store(s) 120 and/or in any other suitable location.

The system 100 can include one or more classification modules 170. The classification module(s) 170 can be configured to identify, classify and/or assess the severity of abnormal driving behavior detected in the driving environment of the vehicle 105. "Driving environment" means at least a portion of the external environment surrounding the vehicle. The driving environment can include other vehicles and objects in the driving environment. These other vehicles and objects can be located in front of (leading), behind (trailing), and/or laterally (e.g., in an adjacent travel lane) from the vehicle 105.

The driving environment can be located within a predetermined distance from the vehicle 105. In one or more arrangements, the predetermined distance can be established by the sensing range of one or more of the sensor(s) 130. The driving environment can include any information about the external environment, including, for example, the presence and/or location of one or more objects in the environment, the identity and/or nature of the objects, traffic conditions and/or weather conditions. Such information about the driving environment can be obtained from the sensor(s) 130 and/or from any other suitable source (e.g. websites, databases, etc.).

The abnormal driving behavior can be classified in various ways and/or by various methods, such as by machine learning and/or computational intelligence methods (e.g. fuzzy logic, neural networks and/or the like), just to name a few possibilities. In some arrangements, the abnormal driving behavior can be classified as being severe (or major) or as being not sever (or minor).

In some arrangements, the abnormal driving behavior can be classified as being severe or major if it readily visible to the human sense of sight. In some arrangements, the abnormal driving behavior can be classified as being not severe or minor if it is not readily visible to the human sense of sight.

Alternatively or additionally, the classification module(s) 170 can be configured to classify the abnormal driving behavior based on one or more thresholds. The threshold(s) can be fixed, or they can be dynamic based on real-time conditions. The threshold(s) can be predefined threshold(s). The threshold(s) can be stored in the data store(s) 120 or in any other suitable location.

In some arrangements, the abnormal driving behavior can be classified as being severe or major if the abnormal driving behavior meets a threshold. For example, the abnormal driving behavior can be classified as being severe or major if the abnormal driving behavior is above a threshold, and the abnormal driving behavior can be classified as being not severe or minor if the abnormal driving behavior is below the threshold. As an example, the threshold can be defined by a distance (X) from the lane center of the road. If the detected abnormal driving behavior includes swerving by an amount that exceeds the distance (X) from the lane center, then the classification module(s) 170 can be configured to classify the abnormal driving behavior as being major or severe. If the detected abnormal driving behavior includes swerving by an amount that does not exceed the distance (X), then the classification module(s) 170 can be configured to classify the abnormal driving behavior as being minor or not severe.

Of course, it will be appreciated that the above threshold is merely one example. There can be other thresholds, such as reaction time, frequency of swerving, amount of veering, distance to vehicle being tailgated, size of gap that the vehicle cut in, and/or number of lane changes, just to name a few possibilities. Further, there may be some thresholds in which the abnormal driving behavior can be classified as being severe or major if the abnormal driving behavior is below a threshold, and the abnormal driving behavior can be classified as being not severe or minor if the abnormal driving behavior is above the threshold.

The system 100 can include one or more notification modules 180. The notification module(s) 180 can cause an alert, message, warning, and/or notification to be presented within the vehicle 105. The notification module(s) 180 can be operatively connected to the output interface(s) 150, and/or components thereof to cause the alert, message, warning, and/or notification to be presented.

The notification module(s) 180 can be configured to cause a particular form of an alert, message, warning, and/or notification to be presented based on the classification of the abnormal driving behavior. For instance, if the abnormal driving behavior is classified as being not severe or minor, the notification module(s) 180 can be configured to cause an amplified version of the abnormal driving behavior to be presented to the human driver of the ego vehicle 105. An "amplified version of the abnormal driving behavior" includes content that amplifies or otherwise accentuates the abnormal driving behavior so that it can be more readily perceived by a human driver. The amplified version can have any suitable form. For instance, the amplified version can have aspects that are visual, audial, haptic, olfactory, or other in nature, or any combination thereof.

In one or more arrangements, the amplified version of the abnormal driving behavior can be a video. As one example, the video can be a magnified video of the abnormal driving behavior. The magnification of the video can make minor abnormal driving behavior appear to be more severe. The video can be magnified using any suitable technology, now know or later developed. As an example, the video can be magnified sing any suitable form of computer vision technology, including, for example, that described in Al-Naji et al. "An efficient motion magnification system for real-time applications," Machine Vision Application, May 2018, which is incorporated herein by reference in its entirety.

If the abnormal driving behavior is classified as being severe or major, the notification module(s) 180 can be configured to cause a notification to be presented to the human driver of the vehicle 105. However, in such case, a magnified video of the abnormal driving behavior may not be presented to the human driver of the vehicle 105.

As noted above, the notification module(s) 180 can cause a magnified video to be presented when the abnormal driving behavior is classified as being not severe or minor. Any suitable degree or level of magnification can be provided. For instance, the magnified video can be at about 1.5×, about 2×, about 3×, about 4×, about 5×, about 6×, about 7×, about 8×, about 9×, about 10×, 100×, or even greater, just to name a few possibilities.

In some arrangements, the degree or level of magnification of the magnified video can be a fixed amount. In some arrangements, the degree or level of magnification of the magnified video can be predetermined. In some arrangements, the degree or level of magnification of the magnified video can be a dynamic value. For example, the degree or level of magnification of the magnified video can be based on one or more real-time factors. Non-limiting examples of the one or more real-time factors can include a compliance rate of the human driver, a type of vehicle that is exhibiting the abnormal driving behavior, current weather conditions, other factors, and any combination thereof.

For instance, if a human driver has a low compliance rate (e.g., often ignores notifications of minor abnormal driving behavior), then the notification module(s) 180 can be configured to increase the degree of magnification. In some arrangements, the degree of magnification can be commensurate with the level of compliance by the human driver. Further, the type of vehicle that is exhibiting the abnormal driving behavior can affect the degree of magnification. For instance, for larger vehicles (e.g., trucks or semi-trailers), the degree of magnification can be less than for smaller vehicles (e.g., passenger cars). Thus, for a larger vehicle, 5× magnification may be more than enough to show that the larger vehicle is swerving inside the travel lane, but, for smaller vehicles, 10× or higher magnification may be needed to mitigate the mismatch between vehicle and human driver perception. Regarding current weather conditions, it may be more difficult to see in certain weather conditions, such as when it is foggy. When fog or other weather conditions are present, the notification module(s) 180 can increase the degree of magnification and/or may speed up the video.

The magnified video can present any suitable content. For example, the magnified video can be a real-time video feed. Alternatively or additionally, the magnified video can be of the previously detected abnormal driving behavior that caused the notification to be presented.

Figure 3:
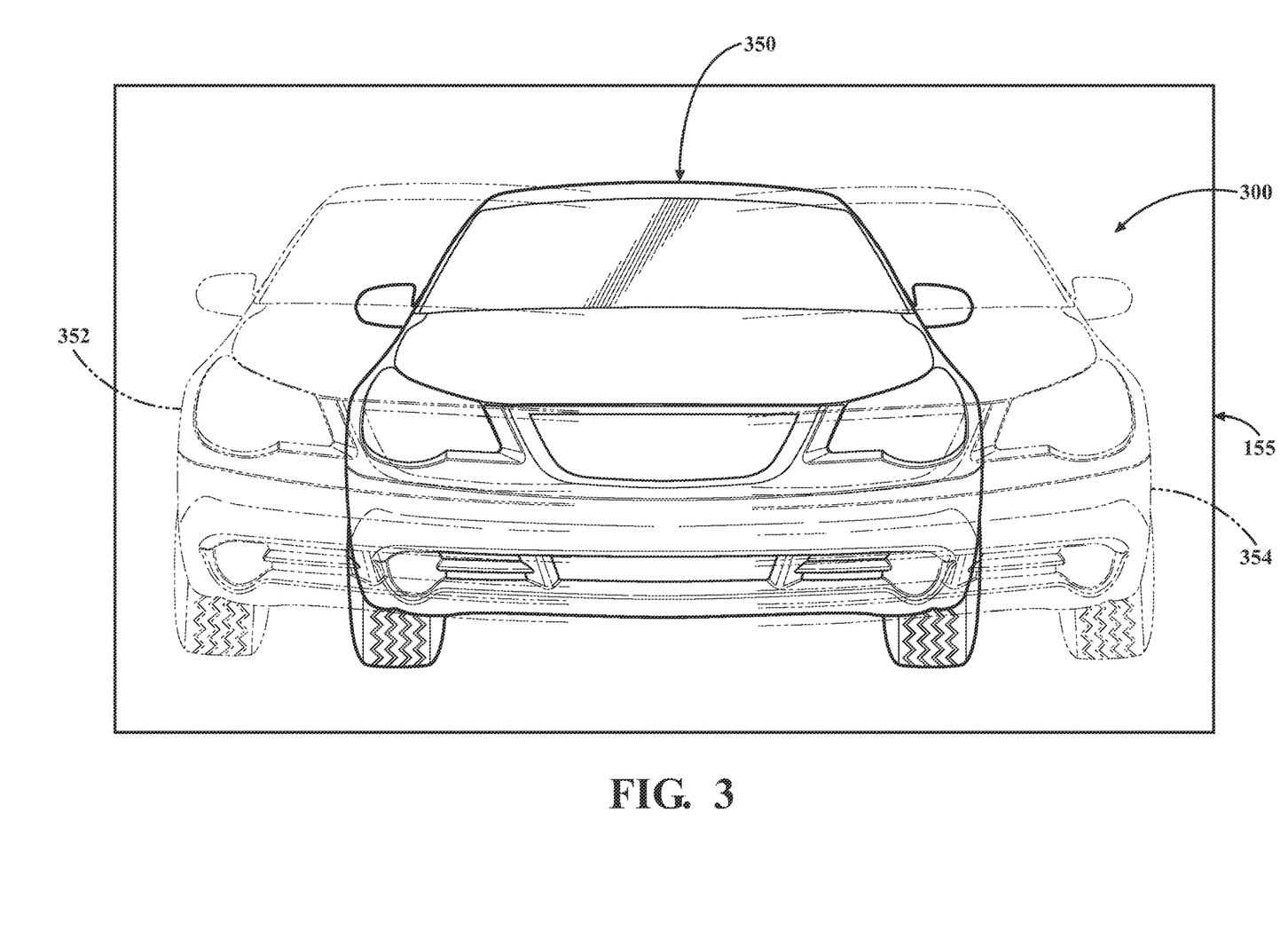
FIG. 3 is an example of a magnified video of abnormal driving behavior presented on a display of the ego vehicle.

The magnified video can include at least a portion of a vehicle that is exhibiting the abnormal driving behavior. FIG. 3 shows one example of a magnified video 300 of abnormal driving behavior presented on one of the displays 155 of the vehicle 105. As shown, the magnified video 300 shows a vehicle 350. The vehicle 350 can appear enlarged on the display 155. The swerving behavior of the vehicle 350 from one side 352 to the other 354, while minor, can be amplified due to the magnification of the video. As such, a driver of the vehicle 105 can readily see the abnormal driving behavior detected by the vehicle 105.

In some arrangements, alternatively or in addition to magnifying the video, the notification module(s) 180 can cause the video to be augmented and/or amplified in other ways. As an example, the notification module(s) 180 can cause the video to be played at a higher speed. For instance, the magnified video can be played at an increased speed of about 1.25×, about 1.5×, about 1.75×, about 2×, about 3×, about 4×, about 5×, about 6×, about 7×, about 8×, about 9×, about 10×, or even greater speed, just to name a few possibilities. In some arrangements, the speed of the magnified video can be a fixed amount. In some arrangements, the speed of the magnified video can be predetermined. In some arrangements, the speed of the magnified video can be dynamic. For example, the speed of the magnified video can be based on one or more real-time factors, including those mentioned above.

Alternatively or in addition to the presenting magnified video, the notification module(s) 180 can cause additional or alternative notifications to be presented, including any of those described below.

The amplified version (e.g., magnified video) can readily demonstrate to a driver the minor abnormal driving behavior observed by the vehicle sensors. A driver may tend to dismiss such minor abnormal driving behavior based on his or her own direct perception of the behavior. However, due to the amplification of the minor abnormal driving behavior, the driver can readily observe the abnormal driving behavior visually. The driver can take appropriate defensive actions.

As noted above, the notification module(s) 180 can be configured to cause a notification to be presented when the abnormal driving behavior is classified as being severe or major. The notification module(s) 180 can cause any suitable type of alert, message, warning, and/or notification to be presented, including, for example, visual, audial, and/or haptic, just to name a few possibilities.

For instance, the notification module(s) 180 can cause one or more visual notifications to be presented. A "visual notification" includes any output that provides an alert, message, warning, and/or notification in a manner that is perceptible to the human sense of sight. The visual notification can be presented by one or more components of the output interface(s) 150, such as on one or more displays or one or more lights. The visual notification can have any suitable form. In one or more arrangements, the visual notification can include one or more words, one or more phrases, one or more messages, one or more symbols, one or more pictures, one or more lights, and/or one or more messages.

In one or more arrangements, the notification module(s) 180 can cause one or more audial notifications to be presented. An "audial notification" includes any output that provides an alert, message, warning, and/or notification in a manner that is perceptible to the human sense of hearing. The audial notification can be presented by one or more components of the output interface(s) 150, such as by being emitted over one or more speakers. The audial notification can have any suitable form. The audial notification can include one or more sounds, one or more words, one or more phrases, and/or one or more messages.

In one or more arrangements, the notification module(s) 180 can cause one or more haptic notifications to be presented. A "haptic notification" includes any output that provides an alert, message, warning, and/or notification in a manner that is perceptible to the human sense of touch. The haptic notification can be presented by one or more components of the output interface(s) 150. The haptic notification can have any suitable form, such as vibration, pressure, heating and/or cooling sensations. In some arrangements, the haptic notification can be presented by one or more haptic actuators. The processor 110 can be operatively connected to the haptic actuators. Any suitable actuator can be used. For instance, the one or more haptic actuators can include motors, pneumatic actuators, hydraulic pistons, relays, solenoids, and/or piezoelectric actuators, just to name a few possibilities. The haptic actuators can be used to provide haptic feedback in the form of vibration and/or pressure. In some arrangements, the haptic notification can be presented by one or more cooling elements and/or one or more heating elements. Any suitable type of cooling elements and/or heating elements, now known or later developed, can be used. Non-limiting examples of cooling elements can include coolers, fans, blowers, air conditioners, etc. Non-limiting examples of heating elements can include heaters, electric heaters, heat coils, etc.

Regardless of the form of the notification, the notification can be an indicator to the driver that he or she should check his or her surroundings for abnormal driving behavior. For instance, the driver can look in his or her rear-view mirror. In the case of abnormal driving behavior that is severe or major, the driver can readily confirm this behavior visually and can take appropriate defensive actions.

It should be noted that one or more of the modules herein, or some other module, can track the behavior of the ego vehicle 105 in response to being presented with the magnified video. For instance, one or more modules can track whether the driver takes any action after being presented the magnified video. Overall, one or more modules can track a driver's compliance rate when presented with abnormal driving behavior. Such information can be useful in determining suitable augmentation of the video to promote compliance by the driver.

The various elements of the system 100 can be communicatively linked through one or more communication networks 195. As used herein, the term "communicatively linked" can include direct or indirect connections through a communication channel or pathway or another component or system. A "communication network" means one or more components designed to transmit and/or receive information from one source to another. The communication network(s) 195 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 195 further can be implemented as or include one or more wireless networks, whether short or long range. For example, in terms of short-range wireless networks, the communication network(s) 195 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long-range wireless networks, the communication network(s) 195 can include a mobile, cellular, and or satellite-based wireless network and support voice, video, text, and/or any combination thereof. Examples of long-range wireless networks can include GSM, TDMA, CDMA, WCDMA networks or the like. The communication network(s) 195 can include wired communication links and/or wireless communication links. The communication network(s) 195 can include any combination of the above networks and/or other types of networks. The communication network(s) 195 can include one or more routers, switches, access points, wireless access points, and/or the like. In one or more arrangements, the communication network(s) 195 can include Vehicle-to-Vehicle (V2V), Vehicle-to-Infrastructure (V2I), Vehicle-to-Cloud (V2C), or Vehicle-to-Everything (V2X) technology, which can allow for communications between the vehicle 105 and other vehicles.

One or more elements of the system 100 include and/or can execute suitable communication software, which enables two or more of the elements to communicate with each other through the communication network(s) 195 and perform the functions disclosed herein.

Figure 7:
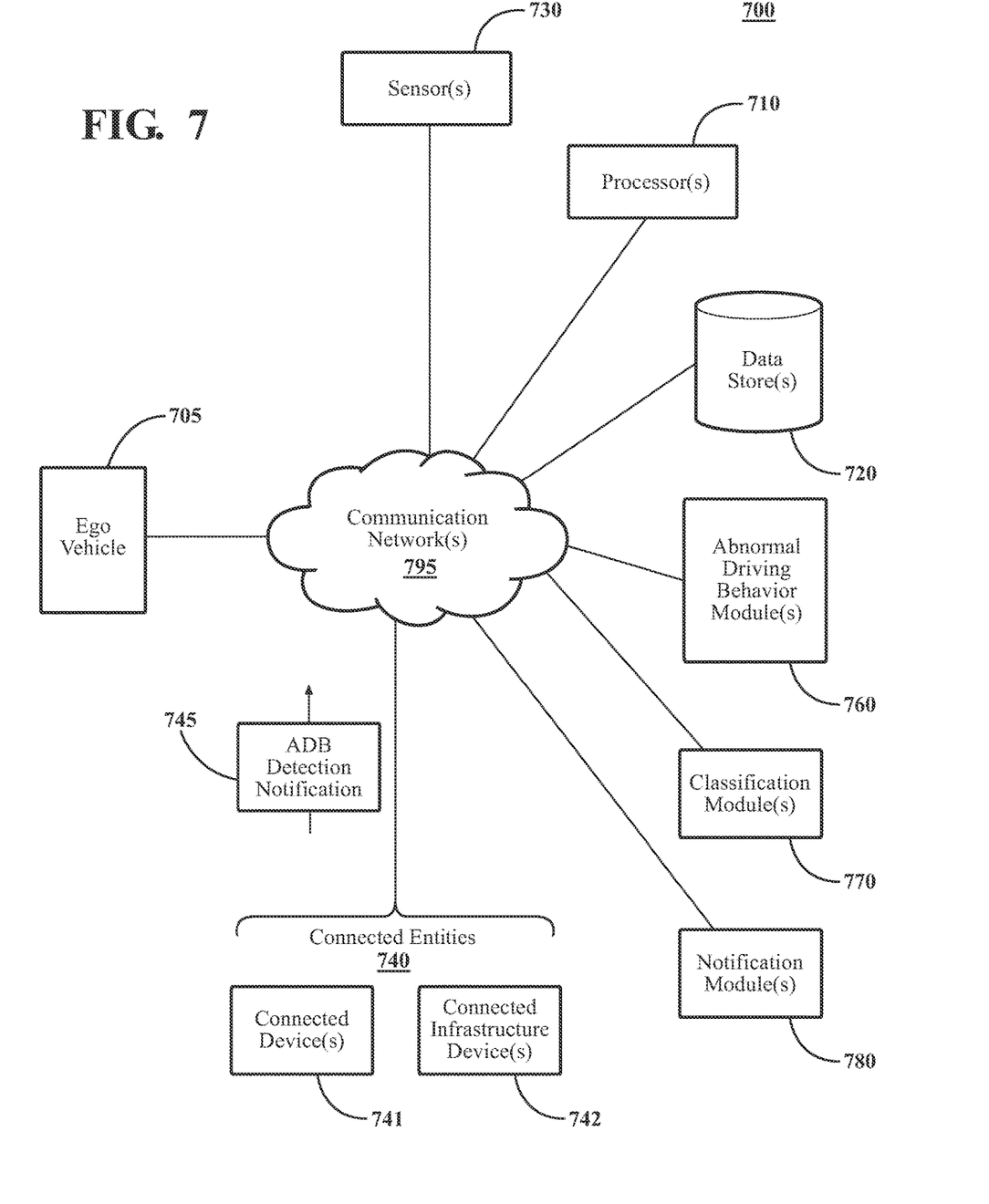
FIG. 7 is an example of a system for compensating for mismatch in abnormal driving behavior detection between a human driver and an ego vehicle.

The vehicle 105 and/or the system 100 can be part of a larger system. Referring to FIG. 7, an example of a system 700 for compensating for mismatch in abnormal driving behavior detection between a human driver and an ego vehicle is shown. Some of the possible elements of the system 700 are shown in FIG. 7 and will now be described. It will be understood that it is not necessary for the system 700 to have all of the elements shown in FIG. 7 or described herein. The system 700 can include one or more processors 710, one or more data stores 720, one or more servers 730, the ego vehicle 705, one or more connected entities 740, one or more abnormal driving behavior modules 760, one or more classification modules 770, and/or one or more notification modules 780.

The above discussion of the processor(s) 110, the data store(s) 120 (including the abnormal driving behavior data 122 and/or the map data 124), the ego vehicle 105, the abnormal driving behavior module(s) 160, the classification module(s) 170, and the notification module(s) 180 in connection with FIG. 1 applies equally to the processor(s) 710, the data store(s) 720, the ego vehicle 705, the abnormal driving behavior module(s) 760, the classification module(s) 770, and the notification module(s) 780 of FIG. 7. The abnormal driving behavior module(s) 760, the classification module(s) 770, and/or the notification module(s) 780 can be a module onboard the ego vehicle 705. However, in some arrangements, the abnormal driving behavior module(s) 760, the classification module(s) 770, and/or the notification module(s) 780 can be located, alternatively or additionally, onboard the server(s) 730 and/or the connected entities 740.

While not shown in FIG. 7, the system 700 (or one or more of the elements thereof) can include the sensor(s) 130, the input interface(s) 140, the output interface(s) 150, and/or the display(s) 155 described above in connection with FIG. 1. One or more elements of the system 700 include and/or can execute suitable communication software, which enables two or more of the elements to communicate with each other through the communication network(s) 795 and perform the functions disclosed herein.

The system 700 can include one or more servers 730. The server(s) 730 can be located remote from the ego vehicle 705 and/or the connected entities 740. The server(s) 730 can be any type of server, now known or later developed. In some arrangements, the server(s) 730 can be cloud-based server(s) or edge server(s). The server(s) 730 can communicate with the ego vehicle 705 and/or with the connected entities 740 over the communication network 795.

The system 700 can include one or more connected entities 740. A connected entity can include any device that is communicatively coupled to the server(s) 730. Non-limiting examples of the connected entities 740 includes one or more connected vehicles 741 and one or more connected infrastructure devices 742. The ego vehicle 705 can be configured to communicate directly with the connected entities 740 and/or via the server(s) 730.

With respect to the connected vehicle(s) 741, the above discussion of the ego vehicle 105 in FIG. 1 can apply equally to the connected vehicle(s) 741. The connected vehicle(s) 741 can be any vehicle. The connected vehicle(s) 741 can be configured to acquire driving environment data. In some arrangements, the connected vehicle(s) 741 can be configured to send and/or receive information to the server(s) 730.

Regarding the connected infrastructure device(s) 742, an "infrastructure device" can be any device positioned along or near a road or other travel path. The connected infrastructure device(s) 742 can include one or more sensors for sensing the surrounding environment and/or for sensing vehicle occupants or pedestrians in the environment. The connected infrastructure device(s) 742 can be, for example, a CCTV camera, a roadside camera, a road side unit (RSU), a street light, traffic light, a smart traffic light, a traffic sign, a road sign, a billboard, a bridge, a building, a pole, or a tower, just to name a few possibilities. In some instances, the connected infrastructure device(s) 742 can be a road itself when the operative components are embedded therein. In some arrangements, the connected infrastructure device(s) 742 can be configured to send and/or receive information to the server(s) 730.

The connected entities 740 can be configured to acquire driving environment data. The connected entities 740 can be configured to analyze the acquired sensor data to detect abnormal driving behavior by a vehicle in the surrounding driving environment. Responsive to detecting the abnormal driving behavior by the vehicle in the surrounding driving environment, the connected entities 740 can be configured to classify whether the abnormal driving behavior is severe. The connected entities 740 can be configured to notify vehicles in the driving environment of the abnormal driving behavior and/or the classification of whether the abnormal driving behavior is severe. The connected entities 740 can be configured to communicate directly with other vehicles or indirectly via the server(s) 730. For instance, the connected entities 740 can send a notification 745 of the abnormal driving behavior to the ego vehicle 705. The connected vehicle(s) 741 can send additional information to the ego vehicle 705, such as location information of the abnormal driving behavior. In this way, the connected vehicle(s) 741 can help the ego vehicle 705 so that it knows where to look and/or what to look for in the driving environment. In response to being alerted to the abnormal driving behavior, the ego vehicle 705 can acquire driving environment data to detect the abnormal driving behavior. The connected vehicle(s) 741 can be configured to communicate directly with other vehicles or indirectly via the server(s) 730.

In some instances, driving environment data acquired by the connected vehicle(s) 741 and/or the connected entities 740 can be sent to the server(s) 730. In some arrangements, the server(s) 730 can be configured to analyze the acquired sensor data to detect abnormal driving behavior by a vehicle in the surrounding driving environment. Responsive to detecting the abnormal driving behavior by the vehicle in the surrounding driving environment, the server(s) 730 be configured to classify whether the abnormal driving behavior is severe. The server(s) 730 can be configured to notify vehicles and/or connected infrastructure in the driving environment of the abnormal driving behavior and/or the classification of whether the abnormal driving behavior is severe. For instance, the server(s) 730 can alert the ego vehicle 705, the connected vehicle(s) 741, and/or the connected entities 740 of the abnormal driving behavior. The server(s) 730 can send additional information to the ego vehicle 705, the connected vehicle(s) 741, and/or the connected entities 740. In response to being alerted to the abnormal driving behavior, the ego vehicle 705, the connected vehicle(s) 741, and/or the connected entities 740 can acquire driving environment data to detect the abnormal driving behavior.

In some arrangements, the server(s) 730, the connected vehicle(s) 741, and/or the connected entities 740 can be configured to cause an amplified version of the abnormal driving behavior to be presented to the human driver of the ego vehicle 705. For instance, the amplified version of the abnormal driving behavior can be presented on one or more displays 155 of the ego vehicle 705. In some arrangements, the display(s) can be located remote from the vehicle 105. For instance, the display(s) can be part of another vehicle (e.g., a connected vehicle) and/or an infrastructure device (e.g., a billboard) in the driving environment. In such case, the magnified video of the abnormal driving behavior can be presented on or more of the displays located outside of the vehicle 105. The display(s) 155 can be selected so that they are likely to be seen be the driver of the ego vehicle 705.

Now that the various potential systems, devices, elements and/or components of the system 100 and the system 700 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 2:
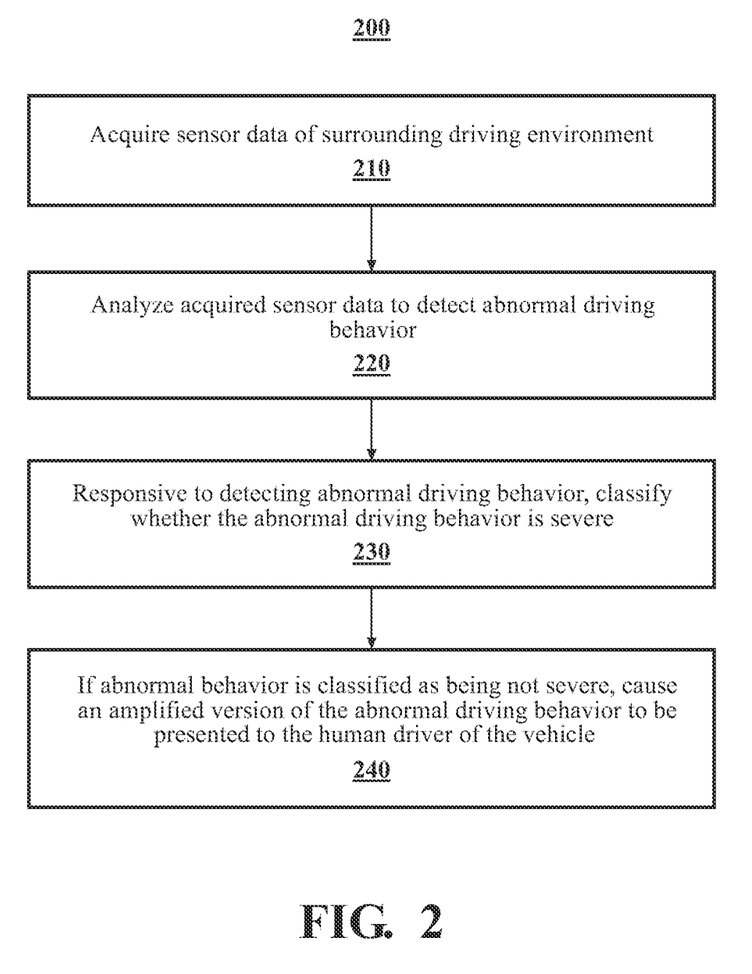
FIG. 2 is an example of a method of compensating for mismatch in abnormal driving behavior detection between a human driver and an ego vehicle.

Turning to FIG. 2, an example of a method 200 for of compensating for mismatch in abnormal driving detection between a human driver and a vehicle is shown. At block 210, sensor data of surrounding driving environment can be acquired. Such acquiring can be performed by one or more of the sensor(s) 130 and, more particularly, one or more of the driving environment sensor(s) 135. The acquiring can be done continuously, periodically, irregularly, randomly, or in response to some condition or event. In some arrangements, the acquiring of the sensor data can be performed responsive to receiving an indication of abnormal driving behavior from an external source. For instance, if another vehicle (e.g., a connected vehicle) or an infrastructure device in the driving environment detects abnormal driving behavior, then the other vehicle and/or the infrastructure device can alert the vehicle 105 that abnormal driving behavior has been detected. These connected entities may also classify the abnormal driving behavior. When received by the vehicle it can prompt to do the acquiring. The method 200 can continue to block 220.

At block 220, the acquired sensor data can be analyzed to detect abnormal driving behavior by a vehicle in the surrounding driving environment. The analyzing can be performed by the abnormal driving behavior module(s) 160 and/or the processor(s) 110. The analyzing can include the use of abnormal driving behavior data 122 in the data store(s) 120. The method 200 can continue to block 230.

At block 230, responsive to detecting abnormal driving behavior by the vehicle in the surrounding driving environment, the abnormal driving behavior can be classified as being major or minor. The classifying can be performed by the classification module(s) 170 and/or the processor(s) 110. The classifying can include the use of abnormal driving behavior data 122 in the data store(s) 120. The method 200 can continue to block 240.

At block 240, if the abnormal driving behavior is classified as being minor, an amplified version of the abnormal driving behavior can be caused to be presented to the human driver of the ego vehicle. Such causing can be performed by the notification module(s) 180 and/or the processor(s) 110. The amplified version can be presented on one or more of the displays 155. It should be noted that the display(s) 155 can be located onboard the vehicle 105. However, alternatively or additionally, the magnified video can be presented on one or more displays located remote from the vehicle 105 (such as on one or more connected entities 740).

The driver of the ego vehicle can view the magnified video. The driver can decide what, if any, action to take. For instance, the driver can decide to change lanes, reroute, etc. to mitigate the risk of collision or otherwise reduce risk.

The method 200 can end. Alternatively, the method 200 can return to block 210 or to some other block. The method 200 can be repeated at any suitable point, such as at a suitable time or upon the occurrence of any suitable event or condition.

Figure 5A:
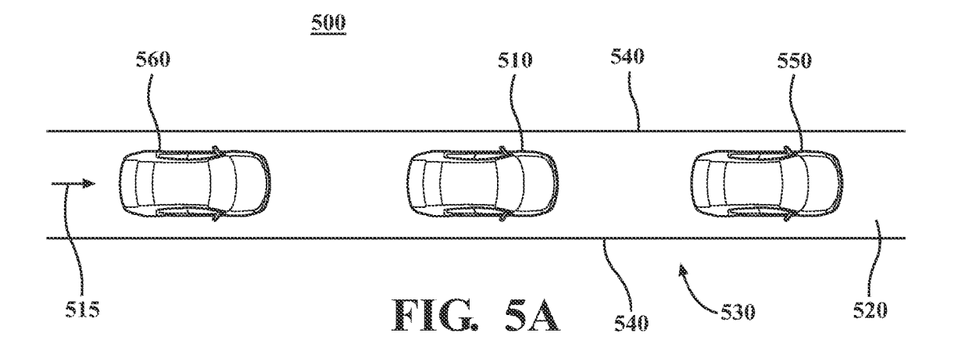
FIG. 5A is a driving scenario, showing an example of normal driving behavior.
Figure 5B:
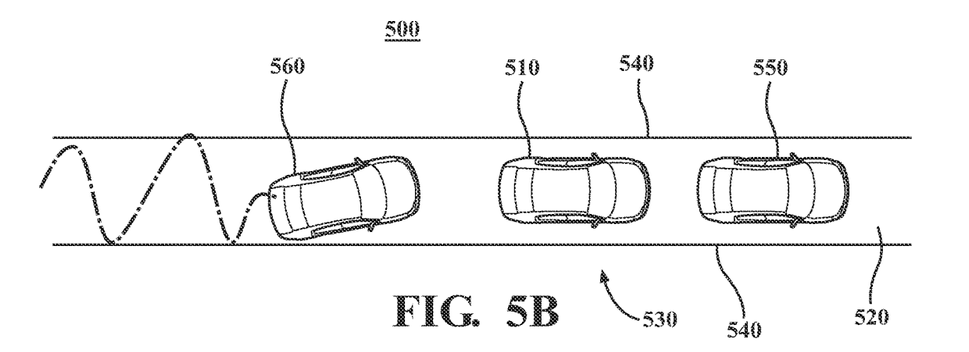
FIG. 5B is a driving scenario, showing an example of major abnormal driving behavior.
Figure 5C:
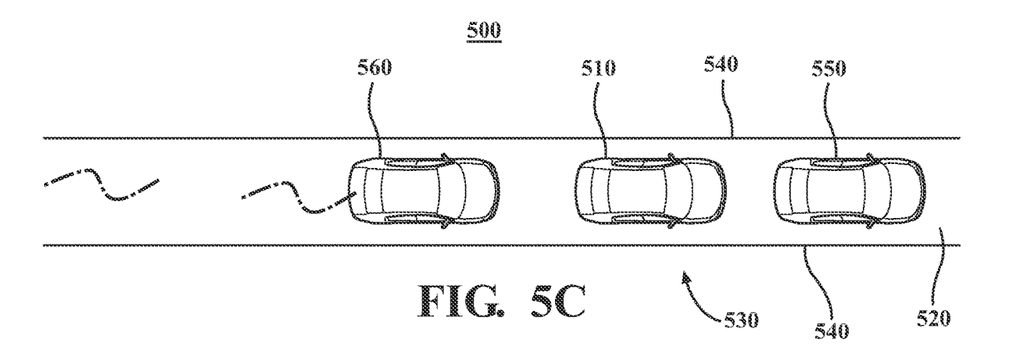
FIG. 5C is a driving scenario, showing an example of minor abnormal driving behavior.

Non-limiting examples of the operation of the arrangements described herein will now be presented. Referring to FIGS. 5A-5C, an example of a driving scenario 500 is shown. In these examples, an ego vehicle 510 can be traveling in a travel lane 520 on a road 530. There can be a leading vehicle 550 located in front of the ego vehicle 510 in a travel direction 515 of the travel lane 520, and there can be a following vehicle 560 located behind the ego vehicle 510 in the travel direction 515 of the travel lane 520.

The ego vehicle 510 can acquire sensor data of surrounding driving environment, such as by using one or more of the driving environment sensor(s) 135. For instance, the ego vehicle 510 can acquire data about the leading vehicle 550 and the following vehicle 560. Further, the ego vehicle 510 can acquire sensor data about the lane markers 540 of the travel lane 520.

The ego vehicle 510 can analyze the behavior of the leading vehicle 550 and the following vehicle 560 to detect whether either vehicle is exhibiting abnormal driving behavior. For example, the ego vehicle 510 can track the lane centering behavior of the leading vehicle 550 and the following vehicle 560. The ego vehicle 510 can measure the lane level driving behavior of subject vehicle (e.g., offset from the lane center, distance measurements to lane markers, etc.). The ego vehicle 510 can analyze the offset from the lane center. The ego vehicle 510 can determine whether there is abnormal driving behavior by assessing the offset from the lane center.

FIG. 5A shows an example of normal driving behavior. Here, the leading vehicle 550 and the following vehicle 560 are staying within a threshold amount of offset from the lane center consistent with normal driving behavior. As a result, the ego vehicle 510 can determine that neither the leading vehicle 550 nor the following vehicle 560 are exhibiting abnormal driving behavior. The ego vehicle 510 does not take any further action in this instance.

FIG. 5B shows an example of severe or major abnormal driving behavior. Here, the leading vehicle 550 is staying within a threshold amount of offset from the lane center consistent with normal driving behavior, but the following vehicle 560 is swerving within the travel lane 520 (or even outside of the travel lane 520). As a result, the ego vehicle 510 can determine that the leading vehicle 550 is not exhibiting abnormal behavior, but the ego vehicle 510 can determine that the following vehicle 560 is exhibiting abnormal driving behavior. The ego vehicle 510 can classify the severity of the abnormal driving behavior of the following vehicle 560. In this example, the abnormal driving behavior can be classified as being severe or major. Severe or major swerving inside the lane can be easy to detect and interpret by a human driver. The driver of the ego vehicle 510 can be notified of the abnormal driving behavior. The driver of ego vehicle 510 can observe the following vehicle and can readily confirm the distracted driving. The driver of the ego vehicle 510 can take any action that he or she sees fit to avoid risk due to the abnormal driving behavior of the following vehicle 560.

FIG. 5C shows an example of minor abnormal driving behavior. Here, the leading vehicle 550 is staying within a threshold amount of offset from the lane center consistent with normal driving behavior, but the following vehicle 560 is swerving very slightly within the travel lane 520. As a result, the ego vehicle 510 can determine that the leading vehicle 550 is not exhibiting abnormal behavior, but the ego vehicle 510 can determine that the following vehicle 560 is exhibiting abnormal driving behavior. The ego vehicle 510 can classify the severity of the abnormal driving behavior. In this example, the abnormal driving behavior can be classified as being minor. This very minor swerving driving behavior can be an early indicator that the following vehicle 560 has a distracted driver. However, this very minor swerving may be difficult to observe with the naked human eye; therefore, the driver of the ego vehicle 510 may not be able to confirm the abnormal driving behavior and/or may not appreciate only a notification provided by the ego vehicle 510 about the detected abnormal driving behavior.

Accordingly, a magnified video of the abnormal driving behavior can be caused to be presented to the human driver of the ego vehicle 510, such as on one or more of the displays of the ego vehicle. As a result, the effects of the minor abnormal driving behavior can be amplified so that the driver of the ego vehicle 510 can understand what the ego vehicle is perceiving and can take appropriate corrective action.

While the above examples are directed to scenarios in which the following vehicle is exhibiting abnormal driving behavior, it will be appreciated that arrangements described herein are not limited in this respect. Indeed, the abnormal driving behavior can be exhibited by the leading vehicle, a vehicle on a side of the ego vehicle, by a vehicle in a different (e.g., adjacent) travel lane, or by more than one vehicle.

In other examples, arrangements described herein can be used so that the ego vehicle observes its own driving behavior and detects distracted driving by the driver of the ego vehicle. For instance, the ego vehicle can observe its own lane centering behavior. If the ego vehicle deviates more than a threshold amount from the lane center, then the ego vehicle can determine that it is exhibiting abnormal driving behavior. In such case, the ego vehicle can provide notifications as described herein to the driver of the ego vehicle and/or to other vehicles in the surrounding environment.

It will be appreciated that arrangements described herein can provide numerous benefits, including one or more of the benefits mentioned herein. For example, arrangements described herein can help to equalize the perception of the driving environment by a human driver and the vehicle. Arrangements described herein can reduce mismatch in the detection of abnormal driving behavior. Arrangements described herein can facilitate early detection of abnormal driving behavior. Arrangements described herein can foster a safer driving environment. Arrangements described herein can reduce the risk of abnormal driving behavior relative to innocent drivers in the nearby vicinity. Arrangements described herein can minimize the propagation of abnormal driving behavior to nearby drivers. Arrangements described herein can help to convince a human driver about the observed minor abnormal driving behavior.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A method of compensating for mismatch in abnormal driving behavior detection between a human driver and an ego vehicle, the method comprising:
   acquiring sensor data of a surrounding driving environment;
   analyzing the acquired sensor data to detect an abnormal driving behavior by a vehicle in the surrounding driving environment;
   responsive to detecting the abnormal driving behavior by the vehicle in the surrounding driving environment, classifying whether the abnormal driving behavior is severe; and
   if the abnormal driving behavior is classified as being not severe, causing an amplified version of the abnormal driving behavior to be presented to the human driver of the ego vehicle.

2. The method of claim 1, wherein the amplified version of the abnormal driving behavior is a magnified video of the abnormal driving behavior.

3. The method of claim 2, wherein a degree of magnification of the magnified video is dynamic based on one or more real-time factors.

4. The method of claim 3, wherein the one or more real-time factors include a compliance rate of the human driver.

5. The method of claim 3, wherein the one or more real-time factors include a type of vehicle that is exhibiting the abnormal driving behavior.

6. The method of claim 3, wherein the one or more real-time factor includes current weather conditions.

7. The method of claim 1, wherein the abnormal driving behavior is classified as being severe if the abnormal driving behavior is readily visible to the human sense of sight, and wherein the abnormal driving behavior is classified as being not severe if the abnormal driving behavior is not readily visible to the human sense of sight.

8. The method of claim 1, wherein the abnormal driving behavior is classified as severe if the abnormal driving behavior meets a predefined threshold.

9. The method of claim 1, wherein the amplified version of the abnormal driving behavior is a video, and further including causing the video of the abnormal driving behavior to be played at an increased speed.

10. The method of claim 1, wherein, if the abnormal driving behavior is classified as being severe, causing a notification to be presented to the human driver of the ego vehicle, and wherein an amplified version of the abnormal driving behavior is not presented to the human driver of the ego vehicle.

11. The method of claim 1, further including causing a notification to be presented to the human driver of the ego vehicle.

12. A system for compensating for mismatch in abnormal driving behavior detection between a human driver and an ego vehicle, the system comprising:
   one or more processors, the one or more processors being programmed to initiate executable operations comprising:
      acquiring sensor data of a surrounding driving environment;
      analyzing the acquired sensor data to detect an abnormal driving behavior by a vehicle in the surrounding driving environment;
      responsive to detecting the abnormal driving behavior by the vehicle in the surrounding driving environment, classifying whether the abnormal driving behavior is severe; and
      if the abnormal driving behavior is classified as being not severe, causing an amplified version of the abnormal driving behavior to be presented to the human driver of the ego vehicle.

13. The system of claim 12, wherein the amplified version of the abnormal driving behavior is a magnified video of the abnormal driving behavior.

14. The system of claim 13, wherein a degree of magnification of the magnified video is dynamic based on one or more real-time factors.

15. The system of claim 14, wherein the one or more real-time factors include a compliance rate of the human driver.

16. The system of claim 14, wherein the one or more real-time factors include a type of vehicle that is exhibiting the abnormal driving behavior.

17. The system of claim 14, wherein the one or more real-time factors include current weather conditions.

18. The system of claim 12, wherein the abnormal driving behavior is classified as being severe if the abnormal driving behavior is readily visible to the human sense of sight, and wherein the abnormal driving behavior is classified as being not severe if the abnormal driving behavior is not readily visible to the human sense of sight.

19. The system of claim 12, wherein the abnormal driving behavior is classified as being severe if the abnormal driving behavior meets a predefined threshold.

20. The system of claim 12, wherein the amplified version of the abnormal driving behavior is a video, and further including causing the video of the abnormal driving behavior to be played at an increased speed.

21. The system of claim 12, wherein, if the abnormal driving behavior is classified as being severe, causing a notification to be presented to the human driver of the ego vehicle, and wherein an amplified version of the abnormal driving behavior is not presented to the human driver of the ego vehicle.

22. The system of claim 12, wherein the ego vehicle includes a display, wherein the display is operatively connected to the one or more processors, and wherein the amplified version of the abnormal driving behavior is presented on the display.

* * * * *